(12) United States Patent
Otsuka et al.

(10) Patent No.: US 8,080,104 B2
(45) Date of Patent: Dec. 20, 2011

(54) FILLING MATERIAL FOR REINFORCING JOINT AND CONSTRUCTION METHOD OF FILLING REINFORCING JOINT

(75) Inventors: Tetsuo Otsuka, Itoigawa (JP); Tooru Shiraiwa, Itoigawa (JP); Tooru Yagi, Itoigawa (JP); Masahiro Abukawa, Tokyo (JP)

(73) Assignees: Denki Kagaku Kogyo Kabushiki Kaisha, Tokyo (JP); Splice Sleeve Japan, Ltd., Tokyo (JP)

( * ) Notice: Subject to any disclaimer, the term of this patent is extended or adjusted under 35 U.S.C. 154(b) by 671 days.

(21) Appl. No.: 11/988,282

(22) PCT Filed: May 22, 2007

(86) PCT No.: PCT/JP2007/060754
§ 371 (c)(1),
(2), (4) Date: Jan. 4, 2008

(87) PCT Pub. No.: WO2008/044361
PCT Pub. Date: Apr. 17, 2008

(65) Prior Publication Data
US 2010/0126389 A1   May 27, 2010

(30) Foreign Application Priority Data

Oct. 13, 2006 (JP) .................................. 2006-279626

(51) Int. Cl.
*C04B 14/00* (2006.01)
*C04B 18/06* (2006.01)
*C04B 14/40* (2006.01)
*C04B 24/00* (2006.01)

(52) U.S. Cl. ......... 106/708; 106/720; 106/624; 106/629

(58) Field of Classification Search .................. 106/708, 106/720, 624, 629
See application file for complete search history.

(56) References Cited

U.S. PATENT DOCUMENTS 3,859,233 A * 1/1975 Barker ............................ 524/43

FOREIGN PATENT DOCUMENTS

| JP | 06-293549 | * | 10/1994 |
| JP | H06-293549 | | 10/1994 |
| JP | 2672004 | | 7/1997 |
| JP | 11-207727 | * | 8/1999 |
| JP | H11-207727 | | 8/1999 |
| JP | 2001-163651 | * | 6/2001 |
| JP | 2005-289656 | | 10/2005 |

* cited by examiner

*Primary Examiner* — Shuangyi Abu Ali
(74) *Attorney, Agent, or Firm* — Manabu Kanesaka

(57) ABSTRACT

A filler for reinforcement joint that ensures excellent fluidity and retention thereof, exhibiting appropriate length change ratio and high strength performance; and a method of reinforcement joint filling operation using the same. There are provided a filler for reinforcement joint containing a cement, an expanding material, a pozzolana micropowder, a water reducing agent and a sand, and a method of reinforcement joint filling operation using the same, characterized in that the expanding material is a calcium aluminoferrite expanding material, and that the pozzolana micropowder is a silicious micropowder having a silicon dioxide ($SiO_2$) content of 90% or higher and having a hydrogen ion concentration falling in an acid region, and that the water reducing agent is a polycarboxylic acid water reducing agent. The calcium aluminoferrite expanding material preferably has a value of Brain specific surface area of 2000 to 6000 $cm^2/g$. The sand is preferably a weighty sand of 3.0 $g/cm^3$ or higher density.

5 Claims, No Drawings

FILLING MATERIAL FOR REINFORCING JOINT AND CONSTRUCTION METHOD OF FILLING REINFORCING JOINT

TECHNICAL FIELD

This invention relates to a filling material for a reinforcing joint to be used in the field of civil engineering and building construction works and a construction method of filling a reinforcing joint using the same. More particularly, the present invention relates to a filling material for a reinforcing joint that is highly fluid and strong but shrinks only to a small extent and a construction method of filling a reinforcing joint using the same.

BACKGROUND ART

Cement mortars that are prepared by adding a water reducing agent to cement have been and being popularly used for civil engineering and building construction works. Furthermore, a calcium sulfoaluminate based or lime type expansive additive and a foaming agent of aluminum powder are added to cement to make it non-shrinkage and then river sand and/or silica sand is compounded to produce paste or mortar. Materials prepared in this way are being popularly employed in construction works particularly to fill fine gaps of concrete structures and gaps produced by back-action construction method, to repair and reinforce structures and also to fill spaces under base plates of machines and apparatus and under slabs of tracks.

Generally, filling mortar materials that are used in civil engineering and building construction works are also referred to as grouts. Grouts include PC grouts, grouts for pre-packed concretes, back filling grouts for tunnels and shields, grouts for pre-casting, grouts for repairing and reinforcing structures, grouts for reinforcing joints, grouts for under bearings of bridges, grouts for under slabs of pavements and tracks, and grouts for under storage containers of nuclear power generation plants.

The quality of concrete to be used for civil engineering and building structures has been improved in recent years and accordingly mortar materials to be used as grouts are required to show a high strength, a high fluidity and a low shrinkage (see Non-Patent Document 1).

Non-Patent Document 1: "An Experimental Study on Filling Performances of High Strength Grout Materials", Summary of the Academic Lectures in the General Convention of Japan Society of Architects, No. 1313, August 1995.

Particularly, there is a demand for cement mortars to be used for filling reinforcing joints connecting reinforcements of structures of reinforced concrete or pre-cast concrete that manifests a high strength and a low shrinkage in addition to a high fluidity because of the current availability of high strength concrete for large and improved earthquake proof reinforced concrete structures that requires by turns joints showing an enhanced strength and a high resistance.

On the other hand, it is known that the use of a cement based grout composition combined with a specific water reducing agent can provide an effect of low temperature dependency, a remarkable effect of retention of fluidity and filling ability and an effect of improving the strength for a long period of time (see Patent Document 1)

Patent Document 1: JP-A-2003-171162

Patent Document 1 describes an invention of "a cement based grout composition of cement, fine aggregate, a water reducing agent, an expansive additive, inorganic finer powder and a foaming substance, characterized in that the compounding ratio of the water reducing agent is 0.05 to 4 mass portions relative to 100 mass portions of cement and the water reducing agent contains in 100 mass portions thereof a melamine sulfonic acid based water reducing agent, a naphthalene sulfonate based water reducing agent and a lignin sulfonic acid based water reducing agent respectively by 0.05 to 4 mass portions, by 10 to 30 mass portions, 55 to 85 mass portions and 5 to 20 mass portions" (claim 1) as well as a cement based grout composition according to claim 1 or 2, characterized in that the inorganic fine powder is fly ash showing a Blaine's specific surface area of not less than 4,000 $cm^2/g$ and an ignition loss of not more than 3.5% (claim 3) but it does not suggest the use of any siliceous fine powder whose silicon dioxide content ratio and hydrogen ion concentration are found within specific respective ranges. Additionally, while it describes the use of a calcium aluminoferrite based expansive additive showing a Blaine's specific surface area of 4,000 $cm^2/g$ (observed by a method conforming to JIS R 5201) (paragraph [0028]), it does not describe the use of a polycarboxylic acid based water reducing agent nor suggest the use of a combination of a specific siliceous fine powder, a calcium aluminoferrite based expansive additive and a polycarboxylic acid based water reducing agent in order to a filling material for a reinforcing joint showing an excellent retention of fluidity, a high strength and a low shrinkage.

Furthermore, a method of manufacturing mortar-concrete showing a high strength by using specific aggregate and silica fume in combination (see Patent Document 2).

Patent Document 2: JP-A-05-58701

While Patent Document 2 describes an invention of a "method of manufacturing mortar-concrete characterized by using aggregate containing quartz or feldspar and having physical properties including a specific gravity of not less than 2.58, a shear hardness of not less than 90 and a compressive strength of not less than 2,000 $kgf/cm^2$, and water-binder ratio by not more than 25%, adding silica fume containing $SiO_2$ by not less than 90% as admixture by 5 to 20% of the weight of the cement and preparing them by using a high performance AE water reducing agent" (claim 1). However, while it describes silica fume only in terms of $SiO_2$ content ratio (paragraphs [0006], [0007] and [0009]), it does not describe hydrogen ion concentration nor shows it any intention of improving the fluidity. Furthermore, while it describes the use of a high performance AE water reducing agent, it does not describe anything about using an expansive additive in combination nor about manufacturing a filling material for a reinforcing joint showing properties including an excellent retention of fluidity, a high strength and a low shrinkage prepared by adding silica fume, a calcium aluminoferrite based expansive additive and a polycarboxylic acid based water reducing agent in combination.

It is also known that a cement composition of belite-rich cement, silica fume, a cement dispersant containing a polycarboxylic acid based polymeric compound having a polyalkylene glycol chain as principal ingredient, a lime based additive or an organic shrinkage reducing agent, a substance for generating pressure countering the shrinkage stress produced by the hydration reaction of the belite-rich cement and fine aggregate having a specific gravity of not less than 3.4 and a coefficient of water absorption between 0.5 and 1.5% provides a good retention of fluidity and a high strength (see Patent Document 3).

Patent Document 3: JP-A-2003-286064

Patent Document 3 describes "containing belite-rich cement as indispensable ingredient" (paragraph [0014]) and also that a composition prepared without using belite-rich cement (by using ordinary cement) showed a flow value less than 140 mm and 60 minutes after mixing and did not stably provide a high fluidity in a physical property evaluation test where a cement compound containing silica fume, a cement dispersant containing a polycarboxylic acid based polymeric compound having a polyalkylene glycol chain as principal ingredient, a lime based additive, a substance (carbon based foaming agent) for generating pressure countering the shrinkage stress produced by the hydrating reaction of the belite-rich cement and fine aggregate having a specific gravity of not less than 3.4 and a coefficient of water absorption between 0.5 and 1.5% is mixed with water added to a predetermined ratio (paragraphs [0049], [0051] and [0054]). Thus, it suggests that it is not possible to provide a cement composition having a good fluidity, a high compressive strength and a good non-shrinkage without using belite-rich cement. While the above document describes the average grain size and the carbon content of the silica fume used there (paragraph [0038]), it does not describe anything about the hydrogen ion concentration. Furthermore, it describes that a lime based expansive additive is combined with silica fume and polycarboxylic acid based water reducing agent for use (paragraph [0018]) but does not described about obtaining a filling material showing an excellent retention of fluidity, a high strength and a low shrinkage for a reinforcing joint by using silica fume, calcium aluminoferrite based expansive additive and a polycarboxylic acid based water reducing agent in combination.

It is known to use powder of fine particles containing silicon dioxide ($SiO_2$) as principal ingredient and also zirconium dioxide as an ingredient in order to manufacturing mortar-concrete that can be handled with ease during the manufacturing process and shows a high strength and a high workability by using a water reducing agent to a small extent (see Patent Document 4).

Patent Document 4: JP-A-2004-203733

Patent Document 4 describes an invention of "a method of manufacturing mortar-concrete characterized in that it is prepared by using a mixture obtained by mixing cement, fine aggregate and powder of fine particles containing silicon dioxide ($SiO_2$) as principal ingredient and also zirconium dioxide as an ingredient" (claim 2) and the use of "$SiO_2$: 92.74 wt %, $ZrO_2$: 4.76 wt %, $Fe_2O_3$: 0.35 wt %, $A_2lO_3$: 0.01 wt %, $TiO_2$: 0.05 wt %, $H_2O$: 0.18 wt %, $Na_2O$: 0.02 wt %, pH: 4.2 and specific surface area: 9.22 $m^2/g$ as observed by the BET method", "density: 2.45 $g/cm^3$, $SiO_2$: 94.5 wt %, $ZiO_2$: 4.0 wt %, pH: 3 to 4, average particle size: 1 μm and specific surface area: 8.7 $m^2/g$ as observed by the BET method (paragraphs [0025] and [0055]) as fine particles (special siliceous fine powder), and a polycarboxylic acid based water reducing agent (paragraph [0054]). However, as it describes that "in the method of manufacturing concrete of this embodiment, the additive of special siliceous fine particles scatters less because they have a large particle size if compared with conventional additives using silica fume of a small particle size so that it is possible to secure a correct mixing ratio and facilitate the operation (paragraph [0038]), it only says that the particle size of the siliceous fine powder is important and does not disclose any technological idea of using "siliceous fine powder having a silicon dioxide ($SiO_2$) content ratio of not less than 90% and a hydrogen ion concentration found in an acid region" in order to obtain a filling material for a reinforcing joint showing an excellent retention of fluidity, a high strength and a low shrinkage. Additionally, the invention described in Patent Document 4 avoids the use of an expansive additive (paragraph [0006]) and therefore those skilled in the art cannot easily get to the idea of using special siliceous fine powder and a calcium aluminoferrite based expansive additive in combination on the bases of the above invention.

An invention of obtaining heavy weight mortar prepared by compounding heavy weight aggregate that shows a suppressed temperature rise without segregation of ingredients is also known (see Patent Document 5)

Patent Document 5: JP-A-2005-47772

Patent Document 5 describes "a mortar composition prepared by compounding cement, an expansive additive, a binder containing pozzolana fine powder, fine aggregate and a water reducing agent, characterized in that the fine aggregate contains particles with a particle size not greater than 0.15 mm by 10 to 20% and has a specific gravity of not less than 3.0 and a particle size of not greater than 2.5 mm, the content thereof being 200 to 300 portions relative to 100 portions of the binder" (claim 1). It also describes that silica fume is used as pozzolana fine powder (paragraph [0020]), and polycarboxylic acid based water reducing agent is used (paragraph [0025]). However, while it shows a calcium sulfoaluminate based expansive additive (paragraph [0011]), it does not describe anything about a calcium aluminoferrite based expansive additive nor describes it about the silicon dioxide content ratio and the hydrogen ion concentration of silica fume. Thus, it is not intended to dissolve the problem of obtaining a filling material for a reinforcing joint showing an excellent retention of fluidity, a high strength and a low shrinkage by using a calcium aluminoferrite based expansive additive, a special pozzolana fine powder and a polycarboxylic acid based water reducing agent in combination.

An invention of mortar that shows a high fluidity if the water-cement ratio is low and a high compressive strength of not less than 80 $N/mm^2$ after setting in 28 days of age without showing any segregation of ingredient materials and is adapted to be suitably used as high strength non-shrinkage grout mortar is also known (see Patent Document 6).

Patent Document 6: JP-A-2005-119885

Patent Document 6 describes "a mortar composition characterized by containing (A) cement, (B) granular cement clinker and (C) one or more materials selected from a water reducing agent, ultra fine powder and aggregate showing a specific gravity of not less than 2.7" (claim 1). It also describes using a calcium aluminoferrite based expansive additive (paragraph [0020]), a polycarboxylic acid based water reducing agent (paragraph [0014]) and silica fume as ultra fine powder (paragraph [0015]) but what is actually used is a naphthalene sulfonic acid based water reducing agent and a lime based expansive additive (paragraph [0024]). Moreover, it neither describe the silicon dioxide content ratio and the hydrogen ion concentration of the employed silica fume nor the use of calcium aluminoferrite based expansive additive, specific silica fume and polycarboxylic acid based water reducing agent in combination in order to obtain an excellent retention of fluidity, a high strength and a low shrinkage. As pointed out above, the invention described in Patent Document 4 avoids the use of an expansive additive and therefore those skilled in the art cannot easily get to the idea of using special siliceous fine powder described in Patent Document 4 as ultra fine powder as described in Patent Document 6 to be used with an expansive additive in combination.

DISCLOSURE OF THE INVENTION

Problem to be Solved by the Invention

The present invention is intended to solve the problem not described in the above-described documents of the conventional art and the problem to be solved by the present invention is to provide a filling material for a reinforcing joint that can achieve an excellent fluidity, a high strength and a low shrinkage and a method of manufacturing the same.

Means for Solving the Problem

As a result of intensive research efforts for solving the above identified problem, the inventors of the present invention found that the problem is solved by using a calcium aluminoferrite based expansive additive, specific pozzolana powder and a polycarboxylic acid based water reducing agent in combination and employing a filling material for a reinforced joint containing fine aggregate and completed the present invention on the basis of the above finding.

The present invention provides the following for solving the above-identified problem.

(1) A filling material for a reinforcing joint containing cement, an expansive additive, pozzolana fine powder, a water reducing agent and fine aggregate, characterized in that the expansive additive is a calcium aluminoferrite based expansive additive and the pozzolana fine powder is siliceous fine powder with a silicon dioxide ($SiO_2$) of not less than 90% and a hydrogen ion concentration found in an acid region, while the water reducing agent is a polycarboxylic acid based water reducing agent.

(2) The filling material for a reinforcing joint containing cement as defined in (1) above, characterized in that the calcium aluminoferrite based expansive additive shows a Blaine's specific surface area between 2,000 and 6,000 $cm^2/g$.

(3) The filling material for a reinforcing joint containing cement as defined in (1) or (2) above, characterized in that the calcium aluminoferrite based expansive additive is contained by 1 to 4 portions in 100 portions of the binder formed by the cement, the expansive additive and the pozzolana fine powder.

(4) The filling material for a reinforcing joint containing cement as defined in any one of (1) through (3) above, characterized in that the pozzolana fine powder is contained by 5 to 15 portions in 100 portions of the binder formed by the cement, the expansive additive and the pozzolana fine powder.

(5) The filling material for a reinforcing joint containing cement as defined in any one of (1) through (4) above, characterized in that it further contains an antifoaming agent.

(6) The filling material for a reinforcing joint containing cement as defined in any one of (1) through (5) above, characterized in that the fine aggregate is heavy weight aggregate with a density of not less than 3.0 $kg/cm^3$.

(7) A construction method of filling a reinforcing joint, characterized in that 20 to 30 portions of water is added to 100 portions of the binder formed by the cement, the expansive additive and the pozzolana fine powder with a filling material for a reinforcing joint as defined in one of (1) through (6) above and the mixture is mixed.

(8) The construction method of filling a reinforcing joint as defined in (7) above, characterized in that a hand mixer, a high-speed grout mixer or a forced mixer is used for mixing the mixture.

Advantages of the Invention

Thus, according to the present invention, there is provided a filling material for a reinforcing joint that shows an excellent retention of fluidity, a high strength and a low shrinkage and a method of filling a reinforcing joint using such a filling material.

BEST MODE FOR CARRYING OUT THE INVENTION

Now, the present invention will be described in greater detail by referring to the accompanying drawings.

The expressions of portion and percent (%) as used herein refer to mass units that are not specifically defined.

For the purpose of the present invention, cement mortar includes cement paste.

According to the present invention, a cement mortar composition containing cement, a calcium aluminoferrite based expansive additive, fine powder of specific pozzolana, a polycarboxylic acid based water reducing agent and fine aggregate is mixed with water to prepare cement mortar, which is then filled into a reinforcing joint.

While expansive additives normally include calcium sulfoaluminate based expansive additives (to be referred to as CSA expansive additives hereinafter), calcium aluminoferrite based expansive additives and lime based expansive additives, calcium aluminoferrite based expansive additives are employed for the purpose of the present invention from the viewpoint of expansiveness, fluidity and sustained retention of water.

An expansive additive is produced by compounding a CaO material, an $Al_2O_3$ material, an $Fe_2O_3$ material and a $CaSO_4$ material to a predetermined ratio and heat-treating the mixture normally at 1,100 to 1,600° C. in an electric furnace or a rotary kiln. The expanding performance of an expansive additive prepared at heat-treatment temperature lower than 1,100° C. can be unsatisfactory, whereas the gypsum anhydride can be decomposed when the heat-treatment temperature exceeds 1,600° C.

Examples of CaO material include limestone and hydrated lime and those of $Al_2O_3$ material include bauxite and aluminum residual ash, while examples of $Fe_2O_3$ material include copper slag and commercially available iron oxide and those of $CaSO_4$ material include dihydrate gypsum, hemihydrate gypsum and anhydrous gypsum.

A calcium aluminoferrite based expansive additive (to be referred to as $C_4AF$ expansive additive hereinafter) is a substance obtained by heat-treating a CaO material, an $Al_2O_3$ material, an $Fe_2O_3$ material and a $CaSO_4$ material that is an expansive substance containing free lime, calcium aluminoferrite and anhydrous gypsum. While there is no limitation to the content ratio of the ingredients, free lime is contained preferably by 30 to 60 portions, more preferably by 40 to 50 portions, in 100 portions of the expansive substance and calcium aluminoferrite is contained preferably by 10 to 40 portions, more preferably by 15 through 35 portions, in 100 portions of the expansive substance, whereas anhydrous gypsum is contained preferably by 10 to 40 portions, more preferably by 20 to 35 portions in 100 portions of the expensive substance.

For the purpose of the present invention, calcium aluminoferrite refers to $CaO-Al_2O_3-Fe_2O_3$ based compounds without any particular limitations, although compounds expressed by $C_4AF$ and those expressed by $C_6AF_2$ are well known, if C indicates CaO, A indicates $Al_2O_3$ and F indicates $Al_2O_3-Fe_2O_3$ normally. It may be safe to say that calcium aluminoferrite normally exists in the form of $C_4AF$.

The fineness of a $C_4AF$ expansive additive is preferably not less than 2,000 $cm^2/g$, preferably between 2,000 and 6,000 $cm^2/g$, in terms of Blaine's specific surface area (to be referred to as Blaine number hereinafter). The additive gives rise to excessive expansion and bleeding tends to arise when the fineness is less than 2,000 cm²/g, whereas the time during which a good fluidity is maintained tends to become short when the fineness exceeds 6,000 cm²/g.

The amount by which a $C_4AF$ expansive additive is used is preferably between 1 and 4 portions, more preferably between 2 and 3 portions, in 100 portions of binder. It may be difficult to achieve a good expansiveness and a good water retention when the amount is less than 1 portion, whereas it may be difficult to achieve a good expansiveness when the amount exceeds 4 portions.

Pozzolana fine powder is used for the purpose of the present invention particularly in order to realize a good fluidity with a low water cement ratio, prevent bleeding and manifest a high strength. It is a siliceous fine powder containing silicon dioxide ($SiO_2$) by not less than 90% and whose hydrogen ion concentration is in the acid region. The expression of hydrogen ion concentration as used herein refers to the value of hydrogen ion concentration in a suspension prepared by putting 20 g of siliceous finer powder into 100 g of pure water and agitating them for five minutes by means of a magnetic stirrer that is observed by means of a PH meter.

Methods for preparing such siliceous fine powder include a method of oxidizing metal silicon fine powder in flames and a method of melting a siliceous raw material in a high temperature flame. Then, siliceous fine powder can be produced by adjusting the heat treatment conditions for the raw material and using a collecting temperature not lower than 550° C. With another method, siliceous fine powder is produced when zircon sand is fused in an electric furnace and then it is collected typically by means of a cyclone and sorted for use.

It is ultra fine particles with an average grain size of not larger than 1 μm.

The amount by which pozzolana fine powder is used is preferably 5 to 15 portions in 100 portions of binder. The manifested strength can be insufficient and/or the ball bearing effect can be lost to give rise to a large load in the mixing process when the amount is less than 5 portions, whereas the load of the mixing process can become large and no excellent fluidity can be achieved by the predetermined rate of use of water when the amount exceeds 15 portions.

It is preferable to use an antifoaming agent for the purpose of the present invention. While there are no particular limitations to the antifoaming agent, examples of antifoaming agent that can be used for the purpose of the present invention include polyoxyethylene alklylether based antifoaming agents and Pluronic based antifoaming agents. The amount by which an antifoaming agent is used is preferably between 0.005 and 0.05 portions relative to 100 portions of binder. The antifoaming effect can be insufficient and the entrapped air and the entrained air of the water reducing agent cannot be removed thoroughly to make the strength and the fluidity unsatisfactory when the amount is less than 0.005 portions. The eliminated foam can come up to the surface of cement mortar to a large extent when the amount exceeds 0.05 portions.

For the purpose of the present invention, a foaming agent that generates gas when mixed with water can additionally be used in order to produce initial expansion of cement mortar after mixing.

Cements that can be used for the purpose of the present invention include various Portland cements such as ordinary, high-early-strength, ultra-high-early-strength, low heat and moderate heat Portland cements various mixed cements prepared by admixing blast furnace slag, fly ash, silica an/or limestone fine powder to such Portland cements as well as waste recycle type cements or so-called eco cements, of which ordinary and high-early-strength cements are preferable from the viewpoint of mixability and manifestation of strength.

For the purpose of the present invention, water reducing agents globally refer to substances that show a dispersing effect and an air entraining effect relative to cement and are adapted to improve fluidity and strength. Specific examples of water reducing agent include naphthalene sulfonic acid based water reducing agents, melamine sulfonic acid based water reducing agents, lignin sulfonic acid based water reducing agents and polycarboxylic acid based water reducing agents. However, a polycarboxylic acid based water reducing agent is used for the purpose of the present invention because it can excellently maintain the fluidity.

While the water reducing agent may be used in the form of powder or liquid, it is preferably in the form of powder from the viewpoint of producing a premixed preparation. The amount by which a polycarboxylic acid based water reducing agent is preferably 0.05 to 0.20 portions, more preferably 0.07 to 0.15 portions relative to 100 portions of binder when it is in the form of powder.

A high fluidity may not be obtained when the polycarboxylic acid is less than 0.05 portions, whereas the bubbles can be generated and/or a setting delay can occur when the polycarboxylic acid exceeds 0.20 portions. A melamine sulfonic acid based water reducing agent or a lignin sulfonic acid based water reducing agent can be added within a range that does not obstruct the effects of the present invention.

Fine aggregate to be used for the purpose of the present invention is preferably heavy weight aggregate such as magnetite, hematite, peridotite, ferrochromium slag, copper slag or electric arc furnace oxidizing slag, although any fine aggregate may be used so long as it can manifest strength and maintain fluidity and has a density of not less than 3.0 g/cm³. For the purpose of the present invention, one or more aggregates may be used. When fine aggregate is brought in as premixed preparation, each of the component aggregates is used as dry sand showing a maximum grain size of 2.0 mm from the viewpoint of fluidity.

The amount by which fine aggregate is used is propriety between 70 and 150 portions relative to 100 portions of binder. Shrinkage can become remarkable when the amount is less than 70 portions, whereas the strength and the fluidity can fall when the amount exceeds 150 portions.

While the amount of water to be used for mixing for the purpose of the present invention is not particularly subjected to any limitations, the water/binder ratio is preferably 20 to 30%, more preferably 22 to 26%. The fluidity and/or the strength can fall remarkably with the ratio out of the above range.

As for the method of filling a reinforcing joint by means of cement mortar according to the present invention, no particular limitations are provided for mixing mortar containing fine aggregate, the use of a hand mixer of a number of revolutions per minute of 900 rpm, an ordinary high-speed grout mixer or a biaxial type forced mixer is preferable.

When a hand mixer or a high-speed grout mixer is employed for mixing, a predetermined amount of water is put into a pail or some other mixing container and then the cement mortar composition prepared by mixing binder and fine aggregate is put into the pail, while driving the mixer to rotate. The mixture is then mixed for more than 2 minutes. On the other hand, when a forced mixer is used for mixing, the premixed cement mortar composition is put into the mixer and a predetermined amount of water is added, while driving the mixer to rotate. Then, the mixture is also mixed for more than 2 minutes. A satisfactory level of fluidity may not be achieved when the mixing time is short of 2 minutes because of insufficient mixing.

The mixed cement mortar is then filled into a reinforcing joint normally by means of a diaphragm type hand pump or a squeeze type mortar pump.

Now, the present invention will be described further by way of examples and reference examples, although the present invention is by no means limited by these examples and reference example.

REFERENCE EXAMPLE 1

For each of the experiments shown in Table 1, 0.24 portions of the polycarboxylic acid based water reducing agent listed in Table 1, 0.04 portions of the antifoaming agent and 100 portions of the fine aggregate listed below were mixed with 100 portions of binder containing the listed portions of the corresponding expansive additive in Table 1 and 12 portions of pozzolana fine powder a to prepare a cement mortar material and water was added to make the water/binder ratio equal to 22% to produce the cement mortar specimen. Then, the cement mortar specimen was mixed for 2 minutes by means of high-speed hand mixer to produce cement mortar and its fluidity was observed in a thermo-hygrostatic chamber at 20° C. and 80% RH.

Additionally, each of the prepared cement mortar specimens was poured into a form in a thermo-hygrostatic chamber at 20° C. and 80% RH to observe the rate of change of the length and the compressive strength. The rate of change of the length and the compressive strength were observed after releasing the specimen from the form and curing it in water at 20° C. to the specified age. The obtained results are listed in Table 1

| <Materials> | |
|---|---|
| cement: | ordinary Portland cement, commercially available |
| expansive additive A: | $C_4AF$ expansive additive with Blaine number of 2,900 $cm^2/g$, commercially available |
| expansive additive B: | $C_4AF$ expansive additive with Blaine number of 1,900 $cm^2/g$ |
| expansive additive C: | $C_4AF$ expansive additive with Blaine number of 5,830 $cm^2/g$ |
| expansive additive D: | $C_4AF$ expansive additive with Blaine number of 6,090 $cm^2/g$ |
| expansive additive E: | CSA expansive additive with Blaine number of 2,850 $cm^2/g$, commercially available |
| pozzolana fine powder a: | silica fumes, pH = 2.90, $SiO_2$ content ratio 95.2%, commercially available |
| antifoaming agent: | polyoxyethylene alkylether based, commercially available |
| water reducing agent: | polycarboxylic acid based agent, commercially available |
| fine aggregate: | ferrochromium slag, density 3.20 $g/cm^3$, 2.0 mm or less, commercially available |

<Measurement Methods>

Fluidity: The static flow was observed in a test conforming to Japanese Standards Association JIS RS201-1997 "Physical Test Method for Cement 11. Flow Test" without 15 falls. The employed flow cone was a cement paste container designed for "Annex 1: Cement Test Method—Measurement of Setting and Stability, 5. Standard Consistency Test".

Rate of change of length: Measured in a test conforming to Annex 1 "Expansiveness Test Method of Mortar Containing Expansive Additive" of Japan Industrial Standards HS A 6202 "Expansive Additive for Concrete". The value observed after aging of 7 days.

Compressive strength: Japan Society of Civil Engineers JSCE-G505-1999 "Compressive Strength Test Method of Mortar or Cement Past Using a Cylindrical Specimen". The value observed after aging of 28 days.

TABLE 1

| Experiment No. | Expansive additive (portion) | Fluidity (mm) 0 min. | 30 min. | 60 min. | Rate of change of length ($\times 10^{-6}$) | Compressive strength ($N/mm^2$) | Remarks |
|---|---|---|---|---|---|---|---|
| 1-1 | — 0 | 205 | 203 | 200 | 53 | 158 | Comp. Example |
| 1-2 | A 1.0 | 211 | 206 | 203 | 232 | 156 | Reference Ex. |
| 1-3 | A 2.0 | 207 | 210 | 207 | 420 | 157 | Reference Ex. |
| 1-4 | A 3.0 | 210 | 213 | 208 | 820 | 159 | Reference Ex. |
| 1-5 | A 4.0 | 213 | 216 | 211 | 920 | 156 | Reference Ex. |
| 1-6 | A 5.0 | 206 | 203 | 201 | 2130 | 141 | Reference Ex. |
| 1-7 | B 3.0 | 215 | 222 | 217 | 2180 | 130 | Reference Ex. |
| 1-8 | C 3.0 | 213 | 215 | 206 | 770 | 155 | Reference Ex. |
| 1-9 | D 3.0 | 200 | 185 | 177 | 630 | 156 | Reference Ex. |
| 1-10 | A 0.5 | 204 | 199 | 193 | 75 | 159 | Reference Ex. |
| 1-11 | E 3.0 | 207 | 160 | 136 | 408 | 160 | Comp. Example |
| 1-12 | E 8.0 | 208 | 155 | 129 | 807 | 162 | Comp. Example |

N.B.: The quantity of expansive additive is expressed by portions in 100 portions of binder.

From Table 1, it will be seen that the cement mortars of the Reference Examples of Experiments No. 1-2 through 1-5 that contained expansive additive A or expansive additive C with a Blaine number of 2,000 to 6,000 $cm^2/g$ by 1 to 4 portions showed an excellent retention of fluidity, an appropriate of the rate of change of the length and a high compressive strength.

To the contrary, the cement mortar specimen containing the expansive additive B to a Blaine number of less than 2,000 $cm^2/g$ showed a low compressive strength and a too large rate of change of the length although its fluidity level was high (Experiment No. 1-7). On the other hand, while the cement mortar specimen containing the expansive additive D to a Blaine number of more than 6,000 $cm^2/g$ showed only a short retention of fluidity although its compressive strength is high (Experiment No. 1-9). Therefore, the specific surface area of expansive additive is preferably between 2,000 and 6,000 $cm^2/g$ in terms of Blaine number.

While an $C_4AF$ expansive additive provides a fluidity and a compressive strength that are acceptable when its content is less than 1 portion in 100 portions of binder, the rate of change of the length is small (Experiment Nos. 1-1 and 1-10). In other words, the effect on the rate of change of the length becomes remarkable in line with the fluidity and the compressive strength when the content gets to 1 portion. However, while the fluidity rises, the compressive strength falls and the rate of change of the length becomes too large (Experiment No. 1-6) when the content exceeds 4 portions. Therefore, the content of the $C_4AF$ expansive additive is preferably between 1 and 4 portions.

The cement mortar specimens in which the $C_4AF$ expansive additive is replaced by a CSA expansive additive (Experiments No. 1-11 and 1-12) showed a poor retention of fluidity and require a high rate of admixing in order to provide a good rate of change of the length if compared with the $C_4AF$ expansive additive. For this reason, a filling material for a reinforcing joint according to the present invention employs a $C_4AF$ based expansive additive.

REFERENCE EXAMPLE 2

The cement mortar specimens of this example were prepared as in Reference Example 1 except that, for each of the experiments shown in Table 2, the listed portions of the polycarboxylic acid based water reducing agent shown in Table 2, 0.04 portions of antifoaming agent and 100 portions of fine aggregate were mixed with 100 portions of binder containing 3 portions of the expansive additive A and the listed portions of the corresponding pozzolana fine powder shown in Table 2. The obtained results are listed in Table 2.

| <Materials> | |
| --- | --- |
| pozzolana fine powder b: | silica fumes, pH = 6.45, $SiO_2$ content ratio 99.9% |
| pozzolana fine powder c: | silica fumes, pH = 7.73, $SiO_2$ content ratio 96.3%, commercially available |
| pozzolana fine powder d: | silica fumes, pH = 9.49, $SiO_2$ content ratio 89.1%, commercially available |

From Table 2, it will be seen that each of the cement mortar specimens of Reference Examples of Experiments Nos. 2-1 through 2-3, No. 1-4 and No. 2-6 that contained the corresponding pozzolana fine powder a or b with a silicon dioxide ($SiO_2$) content ratio of not less than 90% and a hydrogen ion concentration found in the acid region showed an excellent retention of fluidity, an appropriate rate of change of the length and a high compressive strength.

To the contrary, each of the cement mortar specimens of Comparative Examples of Experiments Nos. 2-7 through 2-10 that contained the pozzolana fine powder c with a silicon dioxide ($SiO_2$) content ratio of not less than 90% but with a hydrogen ion concentration found in the region of alkalinity or the pozzolana fine powder d with a silicon dioxide ($SiO_2$) content ratio of less than 90% and a hydrogen ion concentration found in the region of alkalinity did not allow mixing with the amount of water reducing agent equal to that of the pozzolana fine powder a and generated a large quantity of bubbles to make it difficult to produce an excellent level of fluidity, an appropriate rate of change of the length and a satisfactory compressive strength if the amount of the water reducing agent is increased for mixing. To be more accurate, both the rate of change of the length and the compressive strength were low.

Therefore, it was made sure that cement mortar showing an excellent retention of fluidity, an appropriate rate of change of the length and a high compressive strength can be obtained by using pozzolana fine powder with a silicon dioxide ($SiO_2$) content ratio of not less than 90% and a hydrogen ion concentration found in the acid region. For this reason, a filling material for a reinforcing joint according to the present invention employs such pozzolana fine powder.

COMPARATIVE EXAMPLE

The cement mortar specimens of this example were prepared as in Reference Example 1 except that the listed portions of the corresponding water reducing agent shown in Table 3 (a naphthalene sulfonic acid based water reducing agent instead of a polycarboxylic acid based water reducing agent), 0.04 portions of the antifoaming agent and 100 portions of fine aggregate were mixed with 100 portions of

TABLE 2

| Experiment No. | Pozzolana fine powder (portions) | Water reducing agent (portions) | Mixing result | Fluidity (mm) 0 min. | 30 min. | 60 min. | Rate of change of length (×$10^4$) | Compressive strength (N/$mm^2$) | Remarks |
| --- | --- | --- | --- | --- | --- | --- | --- | --- | --- |
| 2-1 | a 5 | 0.24 | Positive | 192 | 189 | 180 | 775 | 151 | Reference Ex. |
| 2-2 | A 10 | 0.24 | Positive | 200 | 202 | 193 | 872 | 160 | Reference Ex. |
| 1-4 | A 12 | 0.24 | Positive | 210 | 213 | 208 | 820 | 159 | Reference Ex. |
| 2-3 | A 15 | 0.24 | Positive | 211 | 213 | 190 | 837 | 163 | Reference Ex. |
| 2-4 | A 17 | 0.24 | Positive | 185 | 177 | 173 | 839 | 151 | Reference Ex. |
| 2-5 | a 3 | 0.40 | Positive | 182 | 172 | 166 | 603 | 130 | Reference Ex. |
| 2-6 | B 12 | 0.24 | Positive | 212 | 218 | 207 | 867 | 163 | Reference Ex. |
| 2-7 | C 12 | 0.24 | Negative | x | x | x | x | x | Com. Example |
| 2-8 | D 12 | 0.24 | Negative | x | x | x | x | x | Com. Example |
| 2-9 | C 12 | 0.40 | Positive | 184 | 169 | 159 | 635 | 151 | Com. Example |
| 2-10 | D 12 | 0.40 | Positive | 180 | 166 | 153 | 617 | 149 | Com. Example |

N.B.: The portions of pozzolana fine powder are those in 100 portions of binder and the portions of water reducing agent are relative to 100 portions of binder.

x indicates not measurable because the mixing result was negative.

binder containing 3 portions of the expansive additive A and 12 portions of the pozzolana fine powder a. The obtained results are listed in Table 3.
<Material>
water reducing agent: naphthalene sulfonic acid based water reducing agent, commercially available From Table 4, it will be seen that each of the cement mortar specimens of Reference Examples of Experiments Nos. 4-1 and 4-2 and No. 1-4 showed an excellent retention of fluidity, an appropriate rate of change of the length and a high compressive strength.

TABLE 3

| Experiment No. | Water reducing agent (portions) | Mixing result | Bubble generation | Fluidity (mm) 0 min. | Fluidity (mm) 30 min. | Fluidity (mm) 60 min. | Range of change of length (×10⁻⁶) | Compressive strength (N/mm²) | Remarks |
|---|---|---|---|---|---|---|---|---|---|
| 3-1 | naphthalene sulfonic acid based 0.24 | Negative | No | x | x | x | x | x | Comparative Example |
| 3-2 | naphthalene sulfonic acid based 0.85 | Positive | Yes | 213 | 202 | 180 | 861 | 155 | Comparative Example |
| 1-4 | polycarboxylic acid based 0.24 | Positive | No | 210 | 213 | 208 | 820 | 159 | Reference Example |

N.B.: The portions of water reducing agent are relative to 100 portions of binder.
x indicated not measurable because the mixing result was negative.

From Table 3, it will be seen that each of the cement mortar specimens of Comparative Examples of Experiments Nos. 3-1 and 3-2 employed a naphthalene sulfonic acid based water reducing agent and pozzolana fine powder with a silicon dioxide ($SiO_2$) content ratio of not less than 90% and a hydrogen ion concentration found in the acid region but did not allow mixing with the amount of water reducing agent equal to that of a polycarboxylic acid based water reducing agent and required more water reducing agent. Then, as a result, a large quantity of bubbles was generated.

Thus, as shown by Comparative Examples, it is not possible to obtain cement mortar showing an excellent retention of fluidity, an appropriate rate of change of the length and a high compressive strength by using a water reducing agent other than a polycarboxylic acid based water reducing agent. For this reason, a filling material for a reinforcing joint according to the present invention employs a polycarboxylic acid based water reducing agent.

REFERENCE EXAMPLE 3

The cement mortar specimens of this example were prepared as in Reference Example 1 except that 0.24 portions of a polycarboxylic acid based water reducing agent, 0.04 portions of an antifoaming agent and 100 portions of fine aggregate were mixed with 100 portions of binder containing 3 portions of the expansive additive A and 12 portions of the pozzolana fine powder a and mixed with the corresponding water/binder ratio of the corresponding shown in Table 4. The obtained results are listed in Table 4.

To the contrary, a large load can be applied for mixing when the water/binder ratio is less than 20%, whereas a large quantity of bubbles were generated and the compressive strength was low in Experiment No. 4-3 where the water/binder ratio exceeded 30%, although an excellent retention of fluidity was obtained.

For this reason, a filling material for a reinforcing joint according to the present invention employs a water/binder ratio between 20 and 30%.

EXAMPLE 1

A reinforcing joint according to the present invention was tested by using cement mortar of Experiment No. 1-4 (see Table 1) of Reference Example 1 and its performance was evaluated.

For the test, D25 through D51 of SD590 and SD685 reinforcements were used. After putting reinforcements between each joint specimen, mixed cement mortar was injected into the joint from the injection port thereof by means of a diaphragm type hand pump to fill the inside. The operation of filling the joint specimens with cement mortar was stopped when the latter is discharged from the air exhaust port.

The reinforcing joint specimens filled with cement mortar was matured in a thermostatic chambers at 5° C. and 20° C. to a predetermined age and a joint test was conducted by the test method defined for Class A (structure-related technologies standard manual for building structures "Joint Performance Judgment Standards", 2001 edition).

TABLE 4

| Experiment No. | Water/binder (%) | Mixing result | Fluidity (mm) 0 min. | Fluidity (mm) 30 min. | Fluidity (mm) 60 min. | Rate of change of length (×10⁻⁶) | Compressive strength (N/mm²) | Remarks |
|---|---|---|---|---|---|---|---|---|
| 4-1 | 20 | Positive | 160 | 157 | 151 | 836 | 170 | Reference Example |
| 1-4 | 22 | Positive | 210 | 213 | 208 | 820 | 159 | Reference Example |
| 4-2 | 30 | Positive | 258 | 262 | 258 | 831 | 143 | Reference Example |
| 4-3 | 32 | Positive | 304 | 310 | 304 | 853 | 138 | Reference Example |

The test results of D38 of the SD590 and SD685 reinforcements matured at 20° C. are shown in Tables 5 and 6 below.

Reinforcements cut to 750 mm were used as reinforcement specimens and the joint length and the effective buried length were made equal to 535 mm and 235 mm respectively.

TABLE 5

| Mortar compressive strength (N/mm$^2$) | 34.3 | 63.9 | 85.7 | 118 | 143 | 159 | Standard tensile strength of joint |
|---|---|---|---|---|---|---|---|
| Joint tensile strength (N/mm$^2$) | 547 | 673 | 698 | 732 | 763 | 772 | Not less than 695 |

TABLE 6

| mortar compressive strength (N/mm$^2$) | 30.6 | 87.6 | 119 | 140 | standard tensile strength of joint |
|---|---|---|---|---|---|
| joint tensile strength (N/mm$^2$) | 633 | 914 | 950 | 963 | not less than 805 |

As seen from Tables 5 and 6, the reinforcing joints filled with a filling material for a reinforcing joint according to the present invention achieved the performance of Class A of Joint Performance Judgment Standards without changing the profiles of conventional joints.

Generally, it is known that a joint performs well when the compressive strength of the mortar filled in the joint is high if the length of the reinforcement buried in the joint is same.

If an SD490 reinforcement is used, a conventional joint satisfies the requirements of Class A of Joint Performance Judgment Standards when the compressive strength of the mortar filling the joint is 70 N/mm$^2$. However, it is necessary to increase either the compressive strength of mortar or the length of the reinforcement buried in the joint to use a reinforcement showing a tensile strength greater than the SD490 reinforcement. However, a long joint has to be employed to increase the length of the reinforcement buried in the joint. Then, a new joint needs to be developed and manufactured to an economic disadvantage.

A filling material for a reinforcing joint according to the present invention provides a compressive strength greater than any comparable known materials to make it unnecessary to increase the length of the reinforcement buried in the joint. In other words, an excellent joint performance can be achieved by using any known joints with a filling material according to the present invention.

Additionally, since a filling material according to the present invention shows an excellent retention of fluidity, it can be fed well under pressure by means of a pump and hence shows excellent filling properties when a conventional filling method is employed.

INDUSTRIAL APPLICABILITY

As described above, a filling material for a reinforcing joint according to the present invention shows an excellent retention of fluidity, a good rate of change of the length and a high compressive strength and hence can find applications of filling reinforcing joints for connecting reinforcements in civil engineering and building works including structures of reinforced concrete and pre-cast concrete.

The invention claimed is:

1. A filling material for a reinforcing joint comprising:
cement,
an expansive additive,
pozzolana fine powder,
a water reducing agent, and
a fine aggregate,
wherein
the expansive additive is a calcium aluminoferrite based expansive additive,
the pozzolana fine powder is siliceous fine powder with a silicon dioxide (SiO$_2$) of not less than 90% and a hydrogen ion concentration found in an acid region,
the water reducing agent is a polycarboxylic acid based water reducing agent,
the calcium aluminoferrite based expansive additive shows a Blaine's specific surface area between 2,000 and 6,000 cm$^2$/g and is contained by 1 to 4 portions in 100 portions of a binder formed by the cement, the expansive additive and the pozzolana fine powder,
the pozzolana fine powder is contained by 5 to 15 portions in 100 portions of said binder,
the polycarboxylic acid based water reducing agent is contained by 0.05 to 0.24 portions in the form of powder to 100 portions of said binder, so that the filling material provides a retention of fluidity of 192 mm or higher at 0 min. from preparation of the filling material and 180 mm or higher at 60 min. from the preparation of the filling material determined by Standards Association JIS R5201-1997, a rate of change of the length from 232×10$^{-6}$ to 920×10$^{-6}$ determined by Annex 1 of Japan Industrial Standards JIS A 6202, and a compressive strength of 151 N/mm$^2$ or higher after 28 days from preparation of the filling material determined by Japan Society of Civil Engineers JSCE-G505-1999.

2. The filling material for a reinforcing joint according to claim 1, further comprising an antifoaming agent.

3. The filling material for a reinforcing joint according to claim 1, wherein the fine aggregate is a heavy weight aggregate with a density of not less than 3.0 g/cm$^3$.

4. A construction method of filling a reinforcing joint, comprising
adding 20 to 30 portions of water to 100 portions of said binder formed by the cement, the expansive additive and the pozzolana fine powder with the filling material for the reinforcing joint according to claim 1, and
mixing the mixture.

5. The construction method of filling a reinforcing joint according to claim 4, wherein a hand mixer, a high-speed grout mixer or a forced mixer is used for mixing the mixture.

* * * * *